(12) United States Patent
Sambasivan et al.

(10) Patent No.: US 6,461,415 B1
(45) Date of Patent: Oct. 8, 2002

(54) HIGH TEMPERATURE AMORPHOUS COMPOSITION BASED ON ALUMINUM PHOSPHATE

(75) Inventors: Sankar Sambasivan; Kimberly Ann Steiner, both of Chicago, IL (US)

(73) Assignee: Applied Thin Films, Inc., Evanston, IL (US)

( * ) Notice: Subject to any disclaimer, the term of this patent is extended or adjusted under 35 U.S.C. 154(b) by 0 days.

(21) Appl. No.: 09/644,495

(22) Filed: Aug. 23, 2000

(51) Int. Cl.$^7$ .............................. C01B 25/36; C01F 7/00
(52) U.S. Cl. .............................. 106/14.21; 106/14.05; 252/387; 252/397; 423/305; 428/702; 428/704; 501/95.1; 501/127; 501/153
(58) Field of Search ...................... 106/14.05, 14.21; 252/387, 397; 423/305; 428/702, 704; 501/95.1, 127, 153

(56) References Cited

U.S. PATENT DOCUMENTS

| 4,289,863 A | * | 9/1981 | Hill et al. | ................... 526/106 |
| 4,551,652 A | | 11/1985 | Compen et al. | ............ 313/466 |
| 5,698,758 A | * | 12/1997 | Rieser et al. | ............... 585/502 |
| 6,022,513 A | * | 2/2000 | Pecoraro et al. | ............ 423/311 |

FOREIGN PATENT DOCUMENTS

| GB | 1 396 795 | 6/1975 |
| GB | 1 451 145 | 9/1976 |

* cited by examiner

Primary Examiner—Anthony J. Green
(74) Attorney, Agent, or Firm—Reinhart, Boerner, Van Deuren, S.C.

(57) ABSTRACT

A composition providing thermal, corrosion, and oxidation protection at high temperatures is based on a synthetic aluminum phosphate, in which the molar content of aluminum is greater than phosphorous. The composition is annealed and is metastable at temperatures up to 1400° C.

21 Claims, No Drawings

HIGH TEMPERATURE AMORPHOUS COMPOSITION BASED ON ALUMINUM PHOSPHATE

BACKGROUND OF THE INVENTION

This invention relates to synthetic inorganic compositions which remain metastable and possess other desired properties at mid and high temperature, for example, from 800° C. to 1400° C. and greater.

It is known to use metal oxide coatings for high temperature protection of substrates or other surfaces. Up to the present time, however, there are no known synthetic oxides which can remain amorphous and metastable at temperatures up to 1400° C. or greater. Silica, for example, is known to devitrify/crystallize at temperatures slightly greater than 850° C. Other non-oxide materials, such as silicon oxy-carbide and silicon oxy-nitride rapidly oxidize and form crystalline phases at high temperatures in air.

Aluminum phosphate is a well known inorganic material that has found many uses in applications including catalysts, refractories, composites, phosphate bonded ceramics, and many others. Aluminum phosphate has a low density (d=2.56 g/cm$^3$). It is chemically inert and stable at high temperatures, as well as being chemically compatible with many metals and with most widely used ceramic materials including silicon carbide, alumina, and silica over a moderate range of temperatures.

Aluminum phosphate, however, is unsuitable for use as a high temperature ceramic material because it undergoes polymorphic transformations (quartz-type, tridymite and cristobalite) with corresponding large molar volume changes. Thus, it would be desirable to provide a synthetic form of aluminum phosphate which is metastable and remains substantially amorphous at increasing temperatures, or during heating and cooling cycles. Another desirable property would be to provide an aluminum phosphate composition having a low oxygen diffusivity at high temperatures or in harsh environments, in order to provide oxidation protection and corrosion resistance to substrates such as metals and ceramics.

U.S. Pat. No. 6,036,762 describes a precursor solution for producing metal phosphates using metal salts and phosphorous pentoxide dissolved in a common organic solvent. The preparation of aluminum phosphate is described.

SUMMARY OF THE INVENTION

The present invention contemplates a new class of aluminum phosphate compounds which are formulated to contain an excess amount of aluminum species in the composition, that is, the aluminum atoms exceed the number found in stoichiometric aluminum phosphate, or the number of phosphorous atoms. The composition may be made by the solvent method described in the aforesaid U.S. Pat. No. 6,036,762, incorporated herein by references, with an excess of aluminum salt being incorporated into the mixture in comparison to the phosphorous, with the excess being more than one percent and preferably greater than five percent. The solution is dried and then annealed, for example, at temperatures of 800° C. or greater, in air until the composition attains a dark color. The annealing step is believed to cause a transformation of the molecular structure, with the final product being more than 50% amorphous in content, and with the amorphous nature being sustained for long periods at temperatures up to 1400° C. or greater without oxidation. Depending on the synthetic procedure and presence of other additives, the composition may also contain small crystalline inclusions which can impact other desirable properties, such as toughness and optical activity. The composition exhibits other desirable properties, such as very low oxygen diffusivity, low thermal conductivity and high emissivity. Thus, a particularly suitable application is to use the composition as a coating on a substrate to minimize oxidation of the substrate at high temperatures.

The initially formed organic solution can be converted into any desired form. For example, the solution may be applied to a metal, ceramic or other substrate, such as ceramic composites and then annealed, or it may be converted into any desired shape, such as fibers or filaments or in any other desired molded form, or may be converted into a powder for application to substrates using a suitable spray technique. Various particular potential end use applications will be listed herein.

DETAILED DESCRIPTION

The preferred method for making the composition of the present invention is described in U.S. Pat. No. 6,036,762. An aluminum salt, such as aluminum nitrate having water of hydration is dissolved in an organic solvent, preferably an alcohol such as ethanol. A quantity of phosphorus pentoxide ($P_2O_5$) is dissolved in a separate container in the same solvent. The molar ratio of Al to P in the Al solution is greater than a one-to-one ratio with phosphorous and is preferably at least 1% and most preferably at least 5% greater. The upper practical limit of excess aluminum has not been determined, but compositions containing ten times excess aluminum have been prepared, and a 1.5 to 3.5 excess molar ratio appears to be most promising in terms of retaining the amorphous content at high temperatures.

The two solutions are mixed together. There is a controlled reactivity between the alcohol and ($P_2O_5$) in which phosphate esters are produced. With sufficient aging, the solution becomes sufficiently polymeric to provide good film forming properties.

It is contemplated that additional metals or metallic compounds could be either dissolved in the precursor or added as nano-sized crystals, such as calcium tungstate, erbium phosphate or other phosphates.

The precursor liquid can be coated onto a suitable substrate, such as a metal or alloy or ceramic or mixed with particles of ceramic material requiring oxidation and/or corrosion protection. In addition, the liquid can be drawn into fibers, placed in a mold, or used alone. The liquid is converted into solid, stable form by annealing or pyrolysis in air. Typically, this requires heating to temperatures normally above 750° C. for a period of time, for example, for one hour, or at higher temperatures. Complete annealing becomes evident when the composition assumes a black or dark grey color.

It is believed that the decomposition behavior of organic based precursor at least partially controls the molecular events leading to a unique inorganic compound. The material contains in excess of 50% of an amorphous compound and may also contain nanocrystals. The material remains amorphous and metastable when heated to temperatures from ambient and up to 1400° C. or greater for extended period of time. It is believed that increased storage time of the precursor solution increases amorphous content.

Based on initial observations, it has been found that the amorphous content of the annealed composition of the present invention may be influenced by at least two factors, namely, the chemistry of the substrate to which the precursor solution.

As an example of the first effect, coatings of solution on fibrous substrates appear to be substantially completely amorphous even after annealing at 1200° C. for two hours. This has been initially confirmed by TEM analysis of solution coated and annealed on mallite-alumina fibers with an overcoat of alumina. On the other hand, powders synthesized in alumina crucibles at 1000° C. for 30 minutes contain a significant fraction of AlPO$_4$ crystallites.

Aging of the precursor solution appears to have a significant effect on the phosphorous environment in the precursor as well as the amorphous content in the pyrolyzed product. Storage of the solution in a refrigerator for a period of up to two years or at room temperature for over one month tends to yield more pure amorphous content.

Of the samples tested, the material had a low density in the order of 1.99 to 2.25 g/cm$^3$, in comparison with 3.96 g/cm$^3$ for alumina. The composition exhibits low oxygen diffusivity; in samples conducted containing 75% excess aluminum the chemical diffusivity was in the order of $1 \times 10^{-12}$ cm$^2$/sec at 1400° C. The material also exhibits a high emissivity, potentially useful in thermal protection systems, such as space applications. Thermal conducivity has been measured at 1 to 1.5 W/m.k. The material is inert in various harsh environments, and has a non-wetting character to most materials, including molten aluminum and solid oxides. Coatings as thin as 0.25 microns are capable of protecting metallic and other surfaces.

Potential applications include thermal, corrosion and oxidation protection for metals and metal/ceramic-based thermal protection systems, high emissivity coatings, interface coatings for silicon carbide and oxide based ceramic matrix systems, environmental barrier coatings for metal and ceramic based systems, fibers for composites and fiber lasers, corrosion protection in molten metal processing, monolithic materials for thermal insulation, catalyst supports, as well as many others. The material may also possess a low dielectric constant, making it useful in Radome applications.

EXAMPLE I

To make 850mL of 75.46 g/L a precursor solution to synthesize the amorphous aluminum phosphate material with a 1.75:1 Al:P ratio (0.375 molar excess Al$_2$O$_3$), 408.90 g Al(NO$_3$)$_3$9H$_2$O was dissolved in 382 ml ethanol to make 500 ml of solution. In a separate container in an inert atmosphere, 25.23 g P$_2$O$_5$ was dissolved in 300 ml ethanol. After the P$_2$O$_5$ is dissolved, the two solutions were mixed together and allowed to stir for several minutes. After the solution was thoroughly mixed, it was placed in a large container in an oven at 150C for one or more hours. After the resulting powder is completely dried, it was annealed in air to 1100° C. for one hour to form amorphous aluminum phosphate powder with 0.75 moles excess aluminum per mole aluminum phosphate.

EXAMPLE II

To form an oxidation resistant amorphous aluminum phosphate coating on a rectangular coupon of 304 stainless steel, the piece was dipped in the precursor solution of Example 1, diluted to a certain concentration and removed. The sample was dried in flowing air to remove the solvent. The sample was dried more thoroughly in an oven at 65° C. The piece was annealed in air to 1000° C. (at a ramp rate of 10° C./minute) for 100 hours and cooled to room temperature at 10° C./minute, along with an uncoated piece of 304 stainless steel of the same size and shape. The weight of each uncoated piece was measured prior to anneal. The weight was measured again after coating and anneal. The amorphous aluminum phosphate coated piece showed remarkably less weight gain. The weight gain data is given in the table below.

TABLE 1

Weight gain of uncoated, and C-1.75 coated stainless steel coupons annealed to 1000° C. in air.
The weight gain is related to the weight of the annealed, uncoated coupon.

| Sample | Original weight (g) | Weight after anneal (g) | Weight gained (g) | % Weight gained |
|---|---|---|---|---|
| Amorphous aluminuin phosphate (incl. coating) | 20.3727 | 20.4207 | 0.048 | 0.24% |
| Uncoated | 20.6303 | 22.4123 | 1.782 | 8.64% |

EXAMPLE III

To form an amorphous aluminum phosphate coating on a solid substrate by plasma spray, amorphous aluminum phosphate powder made in Example I is milled to a small and uniform size (around 20 microns) in a ball mill. The powder is then deposited using the small particle plasma spray process (U.S. Pat. No. 5,744,777).

EXAMPLE IV

Bulk amorphous aluminum phosphate is formed by electroconsolidation (U.S. Pat. No. 5,348,694). Finely ground amorphous aluminum phosphate powder was mixed with a binder (1 wt % PEG 8000 and 2 wt % 20M) and then pressed into a pellet. This pellet was pre-sintered at 1200° C. for five hours. The pellet was then electroconsolidated at 1300° C. for 30 minutes. The final pellet had a density of 1.99 g/cm$^3$.

EXAMPLE V

Amorphous aluminum phosphate fibers were made from viscous polymer formed from the precursor solution of Example I. The AlPO$_4$ solution was dried at 50–65 C until 40–30% of the weight is retained. The residue had a mainly clear, glassy appearance with a high viscosity. Green fibers were pulled with a needle, inserted into the viscous residue and quickly removed. The fibers were dried immediately in flowing air at 650° F. The green fibers were then annealed to at least 1000° C. to form amorphous aluminum phosphate fibers.

EXAMPLE VI

Rare earth and other metal ions can be incorporated into the amorphous aluminum phosphate structure. An erbium doped precursor solution with 0.75 moles excess metal (aluminum and erbium) of which 5 mol % is erbium was synthesized in a manner similar to the amorphous aluminum phosphate solution of Example I. 31.2 g Al(NO$_3$)$_3$9H$_2$O was dissolved in 75 ml ethanol. In an inert atmosphere glove box in a separate container, 1.94 g Er(NO$_3$)$_3$ 5H$_2$O was dissolved in 20 ml ethanol. The erbium nitrate solution was added to the aluminum nitrate solution and left to stir for several minutes. In a separate container in an inert atmosphere glove box, 3.55 g P$_2$O$_5$ was dissolved in 40 mL ethanol. After the P$_2$O$_5$ was dissolved, the aluminum nitrate and erbium solution was added and left to stir for several minutes. The solution was then dried at 150° C. for about an hour and annealed to 1000° C. for one hour. X-ray diffraction of this material annealed to 1000° C. for one hour confirms the amorphous structure, with no erbium phosphate crystalline.

What is claimed is:

1. A high temperature stable composition comprising an aluminum phosphate material wherein said aluminum phosphate material has a ratio of aluminum to phosphorous greater than one-to-one, said composition being annealed and characterized by containing at least 50 percent by weight of an amorphous content, said amorphous content of said composition metastable at 1400° C.

2. The composition of claim 1 wherein said composition is a coating on a substrate.

3. The composition of claim 1 wherein said composition is in the form of a fiber.

4. The composition of claim 2 wherein said coating protects said substrate from oxidation at elevated temperatures.

5. The composition of claim 2 wherein said coating protects said substrate from corrosion at elevated temperatures.

6. The composition of claim 1 comprising an additional component selected from the group consisting of a metal and metallic compounds.

7. The composition of claim 6 comprising an additional component selected from the group consisting of a metal and metallic compounds.

8. The composition of claim 7 wherein said metal is selected from the group consisting of erbium, calcium and tungsten.

9. The composition of claim 8 wherein said erbium is within said amorphous aluminum phosphate content of said composition.

10. The composition of claim 7 wherein said amorphous content of said composition includes nanocrystals of calcium tungstate and erbium phosphate.

11. An aluminum phosphate composition, said composition comprising an aluminum phosphate material wherein said aluminum phosphate material has an amount of aluminum relative to phosphorous exceeding five percent, said composition metastable at 1400° C.

12. A method for protecting a substrate from corrosion and oxidation at elevated temperatures, said method comprising the steps of applying a precursor solution to said substrate, said precursor solution comprising the admixture of a phosphorous pentoxide alcoholic solution and an aluminum salt alcoholic solution, wherein the ratio of aluminum to phosphorous is greater than one to one, and thereafter drying said solution and annealing on said substrate.

13. The method of claim 12 wherein said substrate is selected from the group consisting of a metal, an alloy and a ceramic.

14. The method of claim 12 wherein said substrate is steel whereby said steel substrate is protected from corrosion and oxidation at a temperature from ambient up to about 1000° C.

15. A high temperature stable composition comprising an aluminum phosphate material wherein said aluminum phosphate material has a ratio of aluminum to phosphorous greater than one to one, said composition being annealed and characterized by containing at least 50% by weight of an amorphous content, said amorphous content of said composition metastable at a temperature from ambient up to about 1400° C., said composition on a substrate.

16. The composition of claim 15 comprising an additional component selected from the group consisting of a metal and metallic compounds.

17. The composition of claim 16 wherein said metal is selected from the group consisting of erbium, calcium and tungsten.

18. The composition of claim 16 wherein said erbium is within said amorphous aluminum phosphate content of said composition.

19. The composition of claim 16 wherein said amorphous content of said composition includes nanocrystals of calcium tungstate and erbium phosphate.

20. The composition of claim 15 wherein said substrate is a fiber.

21. The composition of claim 15 wherein said composition protects said substrate from corrosion and oxidation.

* * * * *